(12) United States Patent
Sakakibara

(10) Patent No.: US 6,476,728 B1
(45) Date of Patent: Nov. 5, 2002

(54) POWER CONSUMPTION MANAGEMENT APPARATUS AND METHOD

(75) Inventor: Ken Sakakibara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/438,526

(22) Filed: Nov. 12, 1999

(30) Foreign Application Priority Data

Nov. 16, 1998 (JP) .......................................... 10-341190
Oct. 25, 1999 (JP) .......................................... 11-302309

(51) Int. Cl.7 ............................................. G08B 23/00
(52) U.S. Cl. .................. 340/870.02; 340/3.1; 340/3.54; 700/22
(58) Field of Search ............................ 340/870.02, 3.1, 340/3.54; 700/296, 22

(56) References Cited

U.S. PATENT DOCUMENTS 5,880,677 A * 3/1999 Lestician ............... 340/870.02
5,959,549 A * 9/1999 Synesiou et al. ...... 340/870.02

FOREIGN PATENT DOCUMENTS

| JP | 06-350726 | 12/1994 |
| JP | 10-111326 | 4/1998 |

* cited by examiner

Primary Examiner—Timothy Edwards, Jr.
(74) Attorney, Agent, or Firm—Fitzpatrick, Cella, Harper & Scinto

(57) ABSTRACT

The invention intends to provide an apparatus and a method capable of measuring power consumption in a home office and informing an integrated value of the power consumption at certain intervals to an employer of a homeworker, etc. The apparatus supplies power to electric equipment connected to the apparatus, measures an amount of power consumed by the electric equipment, and stores it as an integrated amount of power consumption. The apparatus then reports the integrated amount of power consumption at certain intervals to an outside company or organization registered in advance.

13 Claims, 12 Drawing Sheets

FIG. 4

| | ITEM | VALUE | REMARKS |
|---|---|---|---|
| 4-1 | DEVICE ID No. | 1234 | |
| 4-2 | TOTALIZATION START DATE | 9805311200 | FORMAT : yymmddhhmm |
| 4-3 | TOTALIZATION END DATE | 9806301200 | FORMAT : yymmddhhmm |
| 4-4 | INTEGRATED AMOUNT OF POWER | 343 | UNIT : Kwh |
| 4-5 | **1234#9805311200#9806301200#343## | | |

FIG. 6

| 6-1 | 6-2 | 6-3 | 6-4 | 6-5 | 6-6 | 6-7 |
|---|---|---|---|---|---|---|
| DEVICE ID No. | TOTALIZATION START DATE | TOTALIZATION END DATE | INTEGRATED AMOUNT OF POWER | NAME | POST | ELECTRICAL CHARGE |
| 1234 | MAY 31, 12:00 | JUNE 30, 12:00 | 343Kwh | TARO SUZUKI | BUSINESS DEP. 1st SECTION | ¥8,665 |
| 1235 | MAY 31, 12:00 | JUNE 30, 12:00 | 299Kwh | JIRO YAMADA | BUSINESS DEP. 1st SECTION | ¥7,533 |

FIG. 12

DEVICE ID No. :

∗ 1234

TOTALIZATION START DATE :

∗ MAY 31, 1998, AM 0:00 :

TOTALIZATION END DATE :

∗ JUNE 30, 1998, AM 0:00 :

INTEGRATED AMOUNT OF POWER DURING PERIOD :

∗ 343Kwh

POWER CONSUMPTION MANAGEMENT APPARATUS AND METHOD

BACKGROUND OF THE INVENTION

1. Field of the Invention

The present invention relates to a power consumption management apparatus, a power consumption management method, and a storage medium. More particularly, the present invention relates to a power consumption management apparatus for managing total power consumption of various electric equipment connected to the power consumption apparatus, a power consumption management method applied to a management computer to which an integrated amount of power consumed by the electric equipment and an identification code of the power consumption management apparatus are informed via a communication line from the apparatus, and a storage medium in which a program for executing the power consumption management method is stored.

2. Description of the Related Art

Hitherto, it is common for organizations such as companies, associations and public institutions (referred to, herein, as "organizations" "companies") to purchase or rent prepare an office space where people are engaged in office, business, and technical work not requiring a large-scale facility (those people being hereinafter referred to as "employees"). The employees usually commute to the office space using public traffic facilities, private cars, or other modes of transportation and they are, typically, engaged in work together for a predetermined number of working hours. In the office space, various electric equipment such as telephones, copying machines, facsimiles, computers, and a computer network are provided so that the employees can perform various types of work in an efficient manner.

The use of such electric equipment in a company office space generates electricity bills from the local electric company. As a matter of course, the company pays such electricity bills as a business expense.

In recent years, however, the ill effects of collective working, such as deterioration of commuting situations and air pollution due to the increased number of private cars, have become significant. On the other hand, a communications infrastructure, such as the Internet, and various communications technologies have been developed and expanded to include widespread availability. As a result, collective working is no longer a necessity for companies and their employees. Attention is now being focused on the concept of disperse working in which the employees of an organization are engaged in work at their respective houses (also referred to, herein, as "homeworkers") or preferred places to carry out the work objectives of the organization as a whole.

When an organization carries out disperse working, it is generally the case that each employee uses as a working space (also referred to, herein, as a "home office"), one room of his or her house and a plurality of home offices dispersed in remote areas are interconnected via communication lines. This allows the employees to communicate with one another using information communication terminal equipment, e.g., telephones and facsimiles, and communications application software. The usable communication lines include, e.g., a public subscriber phone network, an ISDN network, and Internet dedicated lines. The usable communications application systems include, e.g., an electronic mail system, a WWW (World Wide Web) system, and a Video conferencing system.

FIG. 1 shows one example of a home office. A home office 1 is generally one room or a part of one room of an employee's house. Various information communication equipment and household electrical appliances are usually employed to perform home-based work in the home office 1.

The information communication equipment can be used to improve work efficiency in the home office 1 or to carry out communications with other homeworkers and a main office. Examples of the equipment include a personal computer 2, a printer 3, a telephone 4 with an answering machine, and a facsimile transmitter/receiver 5. The household electrical appliances are employed to provide a basic working environment of the home office. Typical examples of these appliances include a lighting unit 6, an air conditioner 7, an electric carpet 8, and an electric heater 9.

Of course, such information communication equipment and household electrical appliances require electrical power for operation, and, thus, have cords and plugs for power supply. In general, users connect the plug directly to a receptacle 10 provided in the house for power supply, or connect the plug to the receptacle 10, indirectly, for example through another unit such as a power tap 11 having a cord.

The electric company demands payment from the household in which the home office is located for the power being consumed by the above-mentioned equipment. Typically, the homeworker is responsible for paying these electricity bills. However, if the homeworker is using the equipment to perform work-related tasks, some may view the cost of power consumption as a business expense that should be borne by the company to which the employee belongs.

This viewpoint may also apply to the communication charge for transmission from the telephone and the facsimile used in the home office. However, the employee can usually receive the particulars of the charge for each call via the public subscriber phone line, etc. from the communications company, and hence determine which communication charges are associated with business. The employee is then able to demand payment for the business-related communication charges from the company using the list of the particulars as evidence. It is also customary that an organization employing many employees purchases mobile communication equipment such as cellular phones under the name of the company, then becomes a subscriber of a mobile communication service, and rents the equipment to the employees. In this case, the charges are directly billed to the company so it is not necessary for the employee to calculate the communication charges and request payment from the company.

On the other hand, it is not customary for a company employing homeworkers to pay the electrical charges for power consumed in home offices. There are numerous reasons for this business practice. The home office is usually a part of the homeworker's house and the process of charging for power consumed in the house involves the use of an integrating wattmeter installed by the electrical company. Accordingly, all power consumed in the house is charged collectively, and there is no means for determining which electrical charges are associated with business. The current method of addressing this problem is to pay the homeworkers for the heat and light expenses associated with home working. This payment is based on values of standard rated power consumed by the individual information communications equipment, and the company pays the extra money to all the homeworkers.

However, some homeworkers are engaged in home-based work for an extensive period of time every day in their home offices, while the other employees frequently go out or take a business trip to the main office or to meet with clients such that they do not stay at the home offices for an extensive period of time every day. Also, working hours of the homeworkers are different individually because of different holidays or vacations and flextime working. If a company with a large number of employees pays a fixed amount of extra money evenly to all the homeworkers in spite of the variations described in the above situations, this would possibly invite a feeling of inequity among the homeworkers. Another problem is that the company may find it difficult to pay for expenses of which the amounts cannot be verified.

Even if the company starts paying extra money for power consumed in home offices, it would be difficult to determine which electrical devices are covered by the expenses. While the electrical charges of the information communications equipment can be taken into the extra expense, it is hard to take into the extra expense the electrical charges of the household electrical appliances which are not directly related to business and of which models and rated power consumption are not grasped by the company. However, it is reasonable for the employees working in the home offices to ask for the employers to bear the expenses resulting from the use of air conditioners and lighting units in the home offices since these expenses are comparable to the expenses for air conditioning, lighting units, etc. in the main office which are paid by the employers. In such a case, even if the company understands the concept of the employees working in the home offices, it is still difficult for the company to pay for the power consumed in home offices from the viewpoint of accounting for taxation and the inability to precisely specify the amount of the electrical charges directly related to business.

In order to increase the number of employees who are engaged in home-based work in home offices, as described above, the company should be able to precisely ascertain the amounts of power consumed in the home offices of those employees.

However, in the past apparatus or method capable of realizing the above requirement has been developed. With apparatuses and methods hitherto proposed, an integrating wattmeter for measuring and storing total power consumption of the house is designed to provide an integrated value of power to the electrical company or the like via a communication line, as disclosed in Japanese Patent Laid-Open No. 6-350726 and No. 10-111326, for example. The proposed apparatuses and methods handle total power consumption of the house, and therefore cannot measure power consumption in only a part of the house, i.e., a home office. Further, the destination to which data of power consumption is informed is the electrical company or the associated measuring center, and the data of power consumption cannot be transmitted to other organizations or places.

SUMMARY OF THE INVENTION

In view of the above-described state of art, an object of the present invention is to provide a power consumption management apparatus, a power consumption management method, and a storage medium with which power consumption in a home office is measured and an integrated value of the power consumption during a certain period can be provided to an employer of a homeworker via a communication network.

To achieve the above object, the power consumption management apparatus according to the present invention comprises a power consumption managing unit for supplying power to electric equipment connected to the apparatus, and measuring and storing an integrated amount of power consumed by the electric equipment; and a communicating unit for reporting the integrated amount of power consumption stored in the power consumption managing unit to another location via a communication line.

Also, the power consumption management method according to the present invention comprises a receiving step for receiving integrated amounts of power consumption and corresponding identification information both transmitted from a plurality of power consumption management apparatuses; a user name acquiring step for acquiring user names of the power consumption management apparatuses based on the identification information received in the receiving step by referring to correspondence between the identification information and the user names of the power consumption management apparatuses, the correspondence having been stored in a management computer prior to the receiving step; and a first combining step for combining the user names acquired in the user name acquiring step with the integrated amounts of power consumption which are received in the receiving step and correspond to the user names.

Additionally, a storage medium, storing a program readable by a computer executes a receiving step for receiving integrated amounts of power consumption and corresponding identification information both transmitted from a plurality of power consumption management apparatuses, and a user name acquiring step for acquiring user names of the power consumption management apparatuses based on the identification information received in the receiving step by referring to correspondence between the identification information and the user names of the power consumption management apparatuses, the correspondence being stored in a management computer prior to the receiving step. The program also includes a first combining step for combining the user names acquired in the user name acquiring step with the integrated amounts of power consumption which are received in the receiving step and correspond to the user names.

BRIEF DESCRIPTION OF THE DRAWINGS

FIG. 4 is a table showing specifics of data transmitted from the power consumption management apparatus to a management computer;

FIG. 6 is a table showing one example of results obtained by collecting home-office electrical charges which are indicated on a display screen and are to be paid to homeworkers from the company, etc.;

FIG. 12 shows one example of printing paper on which data is printed according to the third embodiment.

DESCRIPTION OF THE PREFERRED EMBODIMENTS

Preferred embodiments of the present invention will be described below with reference to the drawings.

First Embodiment

In this first embodiment, a power consumption management apparatus including a power tap unit built therein is installed, as one example of the power consumption management apparatus, in a home office. A plurality of information communications equipment and household electrical appliances are connected along with a public subscriber phone line to the power consumption management apparatus. The apparatus periodically transmits an integrated value of power consumption in the home office to a management computer installed in a main office (business office) of the company, etc. registered in advance, to which an employee engaged in the home office belongs, enabling the company, etc. to grasp the amount of power consumed in the home office.

Figure 1:
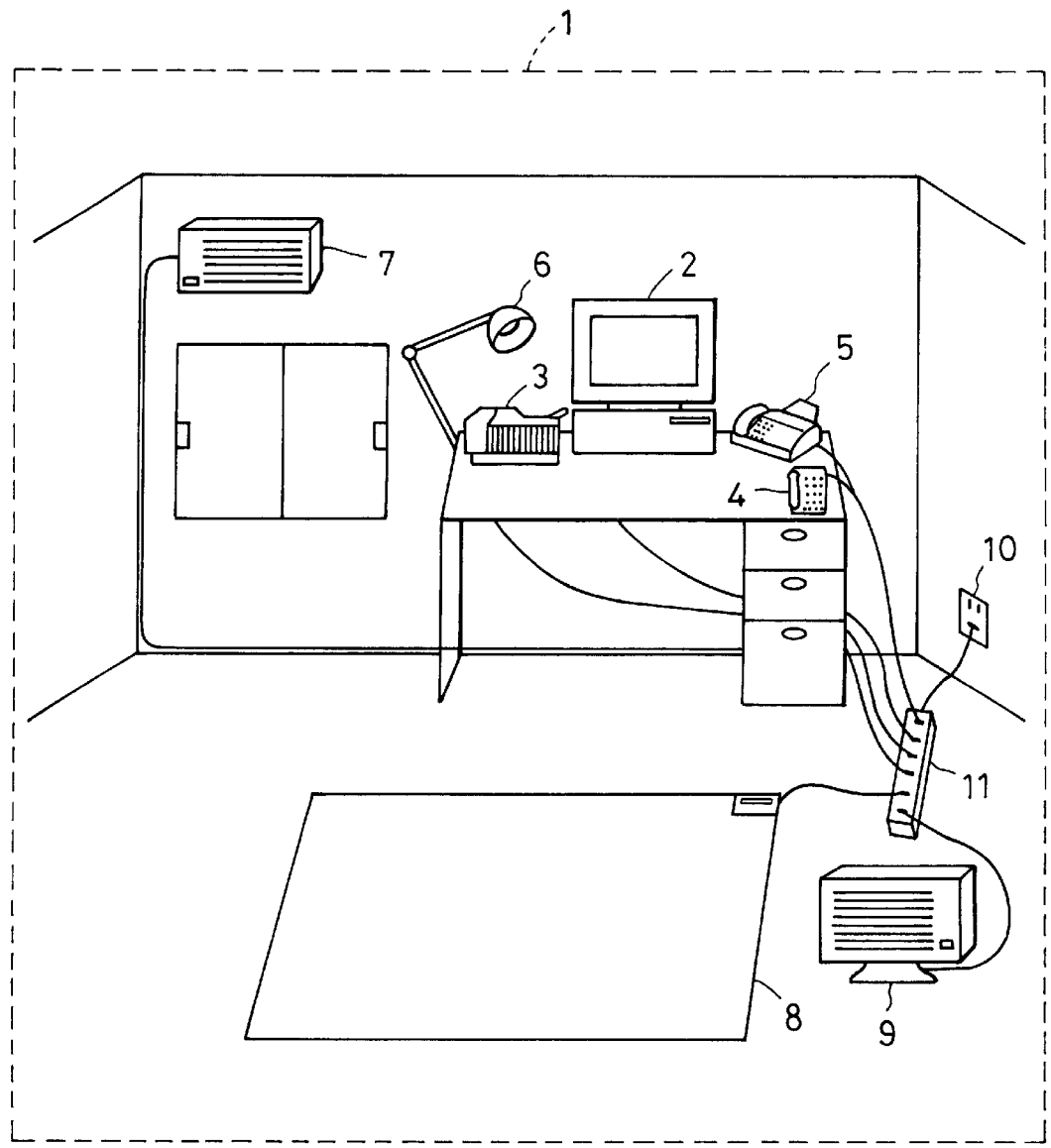
FIG. 1 is a schematic view showing one example of a home office.
Figure 2:
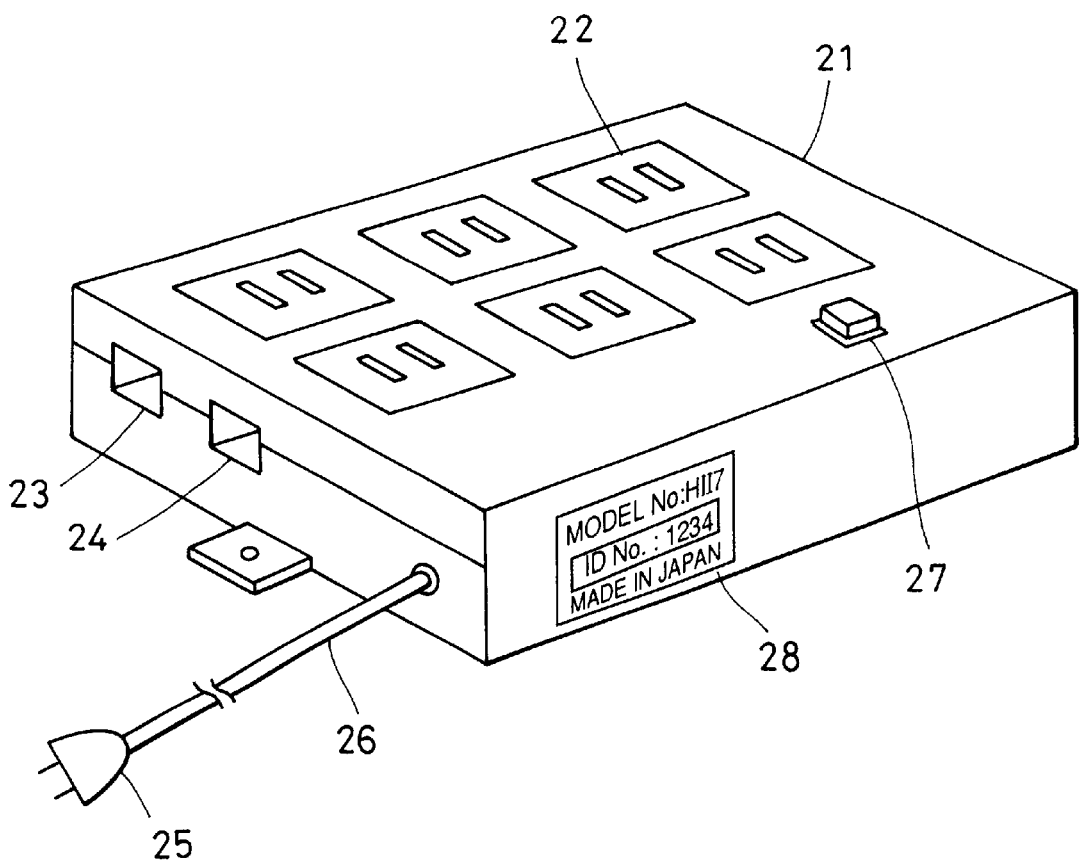
FIG. 2 is a perspective view showing an appearance of a power consumption management apparatus according to a first embodiment of the present invention.

FIG. 2 shows an appearance of the power consumption management apparatus according to the first embodiment of the present invention. Numeral 21 denotes the power consumption management apparatus. Numeral 22 denotes a receptacle provided in a power tap unit for power supply. Plugs of various information communications equipment and household electrical appliances used in the home office are connected to the receptacles for power supply. Numeral 23 denotes a modular jack for connection to a phone line. A public subscriber phone line is usually connected to the modular jack 23 using a modular cable, but an extension line of a home telephone, an analog port of an ISDN terminal adapter or the like may be connected to the modular jack 23 instead. Numeral 24 denotes a modular jack for connection to a telephone. A telephone used in the home office, a facsimile transmitter/-receiver, a PC communication model or the like can be connected to the modular jack 24. Alternatively, the modular jack 24 may be left open. Numeral 25 denotes a plug connected to a receptacle provided in the house for power supply. Numeral 26 denotes a cord for power supply. Numeral 27 denotes a manual informing button which is depressed by the user when power consumption management data in the power consumption management apparatus 21 is to be transmitted upon manual instruction to a management computer at any desired time rather than at certain intervals. Numeral 28 denotes a product nameplate or label of the power consumption management apparatus 21. An ID (identification) number, i.e., a product number with which one of power consumption management apparatuses manufactured in large number can be identified, is engraved or printed on the nameplate or label.

Figure 3:
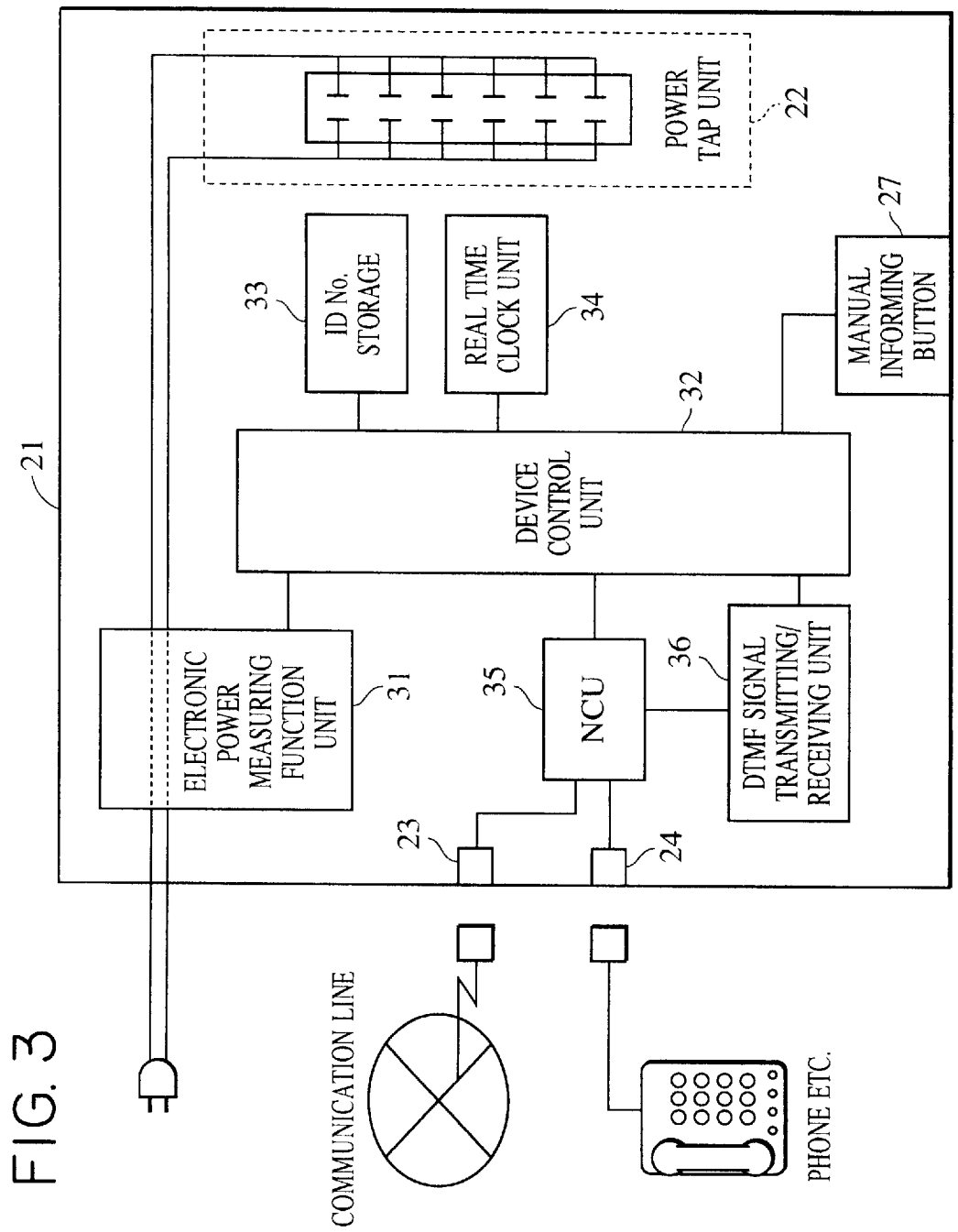
FIG. 3 is a block diagram showing an internal configuration of the power consumption management apparatus.

FIG. 3 shows an internal configuration of the power consumption management apparatus 21. The processing operation of the power consumption management apparatus 21 will be described with reference to FIG. 3.

Numeral 31 denotes an electronic power measuring function unit which includes a current detecting transformer and a voltage detecting transformer (not shown). The electronic power measuring function unit 31 produces a current and a voltage proportional to total power consumption of all electric equipment connected to the power tap unit 22, and inputs A/D-converted signals of the produced current and voltage to a device control unit 32. The device control unit 32 always monitors and processes data regarding the current and voltage sent from the electronic power measuring function unit 31, and then calculates and stores instantaneous power consumption and an integrated amount of power consumption. Upon the manual informing button 27 being depressed, or at certain intervals, e.g., once per month, the device control unit 32 transmits the integrated power data to the management computer which is usually installed in a main office of the company or in a business agency contracting for management work to manage power consumption data of homeworkers from the company. In addition to the integrated amount of power, the device control unit 32 also transmits the ID number specific to the apparatus 21, which is stored in an ID No. storage 33, along with data regarding the totalization start date for the integrated amount of power (usually the date at which the preceding data was transmitted) and the totalization end date for the integrated amount of power (usually the date at which the current data is transmitted) which are obtained from a real time clock unit 34.

In this embodiment, the ID No. storage 33 includes a ROM (Read Only Memory) in which the ID number, i.e., an identification code for specifying the power consumption management apparatus 21, is stored during the manufacture process of the apparatus 21 in a manufacturing factory. The ID number is unchangeable after delivery of the power consumption management apparatus 21 from the manufacturing factory. Additionally, the ID number stored in the ROM is the same as the product number engraved or printed on the product nameplate or label 28. In a modified embodiment, the ID No. storage 33 may comprise a detachable IC card and the ID number may be stored in the IC card. The device control unit 32 also includes a ROM which stores a control program for operating the power consumption management apparatus 21 and information about the interval for transmitting the integrated power data to the management computer.

FIG. 4 is a table showing specifics of data transmitted from the power consumption management apparatus 21 to the management computer. In FIG. 4, row 4-1 denotes the ID number of the apparatus 21 which is stored in the ID No. storage 33 and is indicated on the product nameplate or label 28. Row 4-2 denotes the totalization start date for the integrated amount of power (usually the date at which the preceding data was transmitted) which is transmitted at this time, and 4-3 denotes the totalization end date for the integrated amount of power (usually the date at which the current data is transmitted) which is transmitted at this time. Row 4-4 denotes data of the integrated amount of power (in units of Kilowatt·hour (Kwh). These four types of data are coded and transmitted as a string of symbols and numerals as shown, by way of example, in row 4–5. In row 4–5, ** indicates the start of data and ## indicates the end of data.

Figure 7:
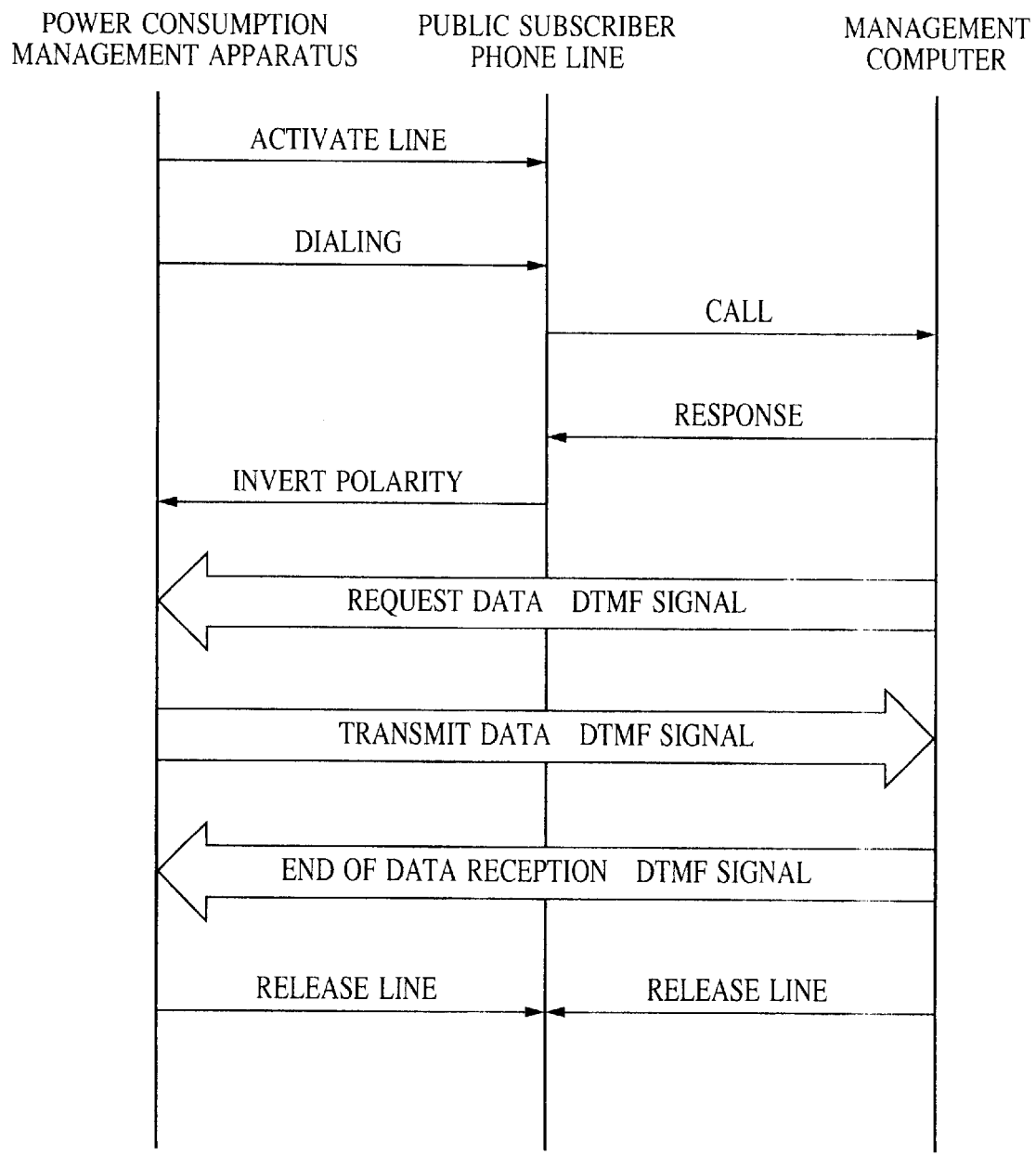
FIG. 7 is a chart showing a sequence of data transfer between the power consumption management apparatus and the management computer.

When the device control unit 32 transmits the data shown in FIG. 4 to the management computer, an NCU (Network Control Unit) 35 is employed to carry out communication control of the public subscriber phone line connected to the apparatus 21, and a DTMF signal transmitting/receiving unit 36 is employed to send the data in the form of a voice signal. A sequence of data transfer between the power consumption management apparatus 21 and the management computer is illustrated in FIG. 7.

Figure 5:
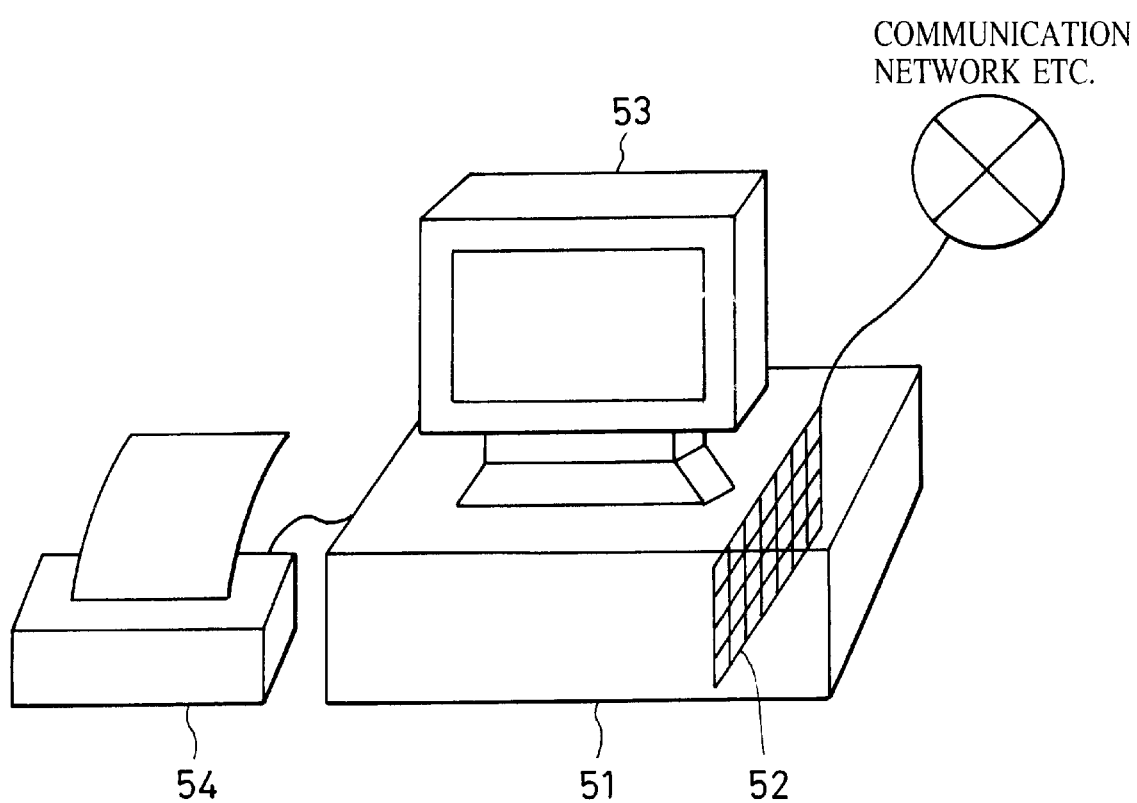
FIG. 5 is a schematic view showing one example of the management computer installed in a main office of a company, etc. which locates outside the home office.

FIG. 5 shows one example of the management computer installed in a main office of the company or in a business agency contracting for management work to manage power consumption data of homeworkers from the company which is located away from the home office. The management computer comprises a personal computer 51, a phone line board 52 with a DTMF signal transmitting/receiving circuit incorporated therein, and dedicated software. The management computer can receive data via a public subscriber phone line or the like from a plurality of power consumption management apparatuses which are installed respectively in individual home offices of a plurality of homeworkers. Also, the management computer can display the received power consumption data for the home offices of the homeworkers on the screen of a display 53, or print the data by a printer 54. Further, by installing a correspondence program between power consumption and charge in advance, the management computer can compute the home-office electrical charges to be paid to the homeworkers from the company and display or print the calculated results.

When the company implements such a system for computing the integrated amounts of power consumed in the home offices of the homeworkers and paying the homeworkers for the electrical charges which correspond to the integrated amounts of power consumed in the home offices, a plurality of power consumption management apparatuses 21 of the present invention should be purchased and one apparatus should be provided to each homeworker. At that time, the company ascertains the ID number engraved or printed on the product nameplate or label 28 of the apparatus 21, and enters a correspondence table in the management computer, such table including the names and posts of the homeworkers and the ID numbers of the apparatuses 21 provided to the homeworkers.

FIG. 6 is a table showing one example of results obtained by collecting home-office electrical charges which are indicated on the screen of the display 53 and are to be paid to the homeworkers from the company. In FIG. 6, columns 6-1 to 6-4 represent the original data received from the respective power consumption management apparatuses. In addition to the original data, the name 6-5 and post 6-6 of each homeworker, and the electrical charge 6-7 are displayed. The name 6-5 and post 6-6 are specified and displayed based on both a homeworker list registered in a database for the management computer in advance, and the correspondence table including the names of the homeworkers and the ID numbers of the power consumption management apparatuses 21. The electrical charge 6-7 is computed based on the power consumption data 6-4 by referring to an electrical charge table registered in the database for the management computer in advance. Further, the computed electrical charge may be transmitted from the management computer to the personal computer 2 in the home office, allowing each homeworker to ascertain the computed electrical charge.

In this way, the power consumption in each home office is measured, and an integrated value of the power consumption for a certain period is informed via the communication network to the employer of the homeworker.

In the above-described embodiment, data such as the power consumption is transmitted in the form of a DTMF voice signal using a public subscriber phone line. As an alternative, it is also possible to transmit the data in the form of a modem (modulation/demodulation unit) signal using the public subscriber phone line, or to perform data transmission using an ISDN line, or to transmit the data using Internet (TCP/IP protocol network). The power consumption management apparatus may incorporate a communication interface function unit and a communication protocol corresponding to any of those communication lines.

Incidentally, total power consumed by the house of each homeworker including the power managed by the power consumption management apparatus, may be transmitted to the electrical enterprise company.

Second Embodiment

A power consumption management apparatus according to a second embodiment of the present invention will be described with reference to FIG. 8 which shows an appearance of the apparatus.

Numeral 121 denotes the power consumption management apparatus according to the second embodiment. Numerals 122 to 128 denote exactly the same components as denoted by 22 to 28 in the first embodiment. Numeral 129 denotes a selection switch which enables a homeworker to manually select one of two states. A first state is effected by tilting a knob of the selection switch 129 toward the front side of a drawing sheet of FIG. 8. When the selection switch 129 is in the first state, power consumption resulting from the use of various information communications equipment and household electrical appliances, which are connected to the power consumption management apparatus 121, is not measured by the power consumption management apparatus. Even in the first state, however, power can be supplied to the various information communications equipment and household electrical appliances through the apparatus 121.

Figure 8:
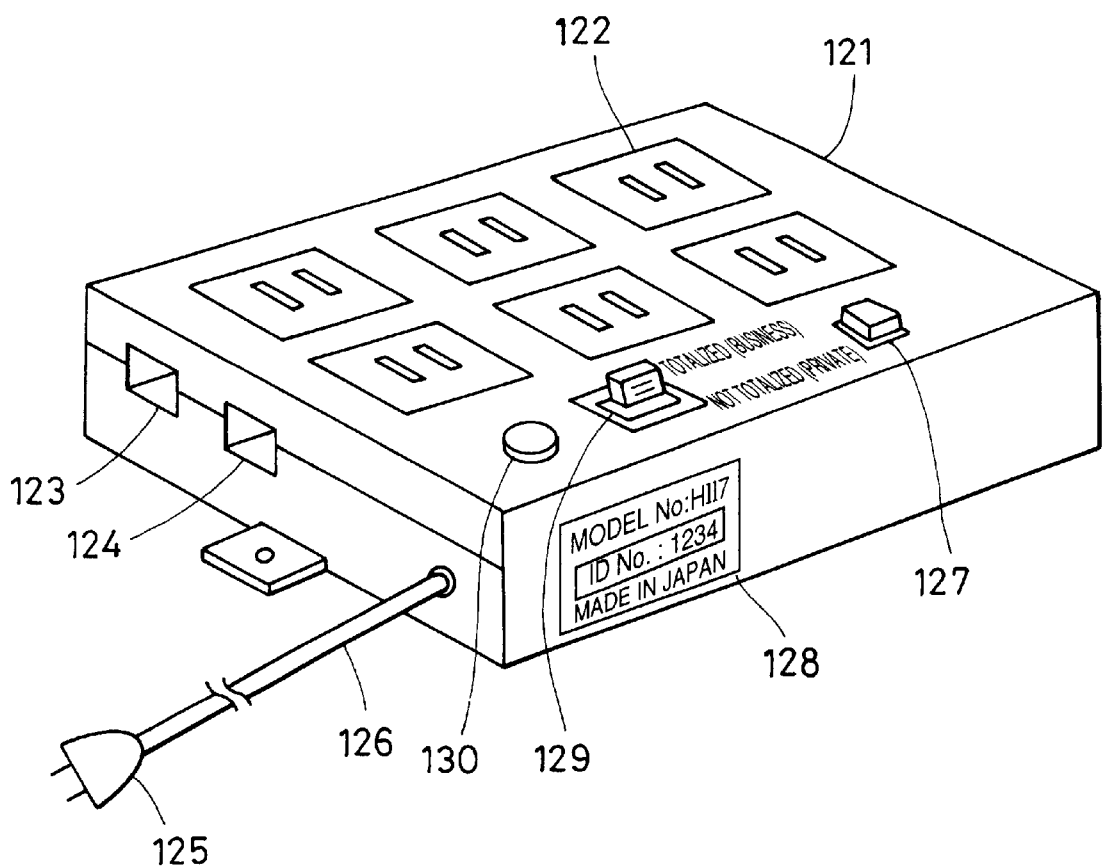
FIG. 8 is a perspective view showing an appearance of a power consumption management apparatus according to a second embodiment of the present invention.

A second state is effected by tilting the knob of the selection switch 129 toward the back side of the drawing sheet of FIG. 8. When the selection switch 129 is in the second state, power consumption resulting from the use of the various information communications equipment and household electrical appliances, which are connected to the power consumption management apparatus 121, is measured by the power consumption management apparatus. The operation of the power consumption management apparatus 121 in this case is exactly the same as that in the first embodiment.

Numeral 130 is a selected state indicator which comprises an indication lamp enabling the homeworker to visually easily confirm in which one of the first and second states the selection switch 129 is. When the selection switch 129 is in the first state, the selected state indicator 130 lights up red, and when the selection switch 129 is in the second state, the selected state indicator 130 lights up green.

Figure 9:
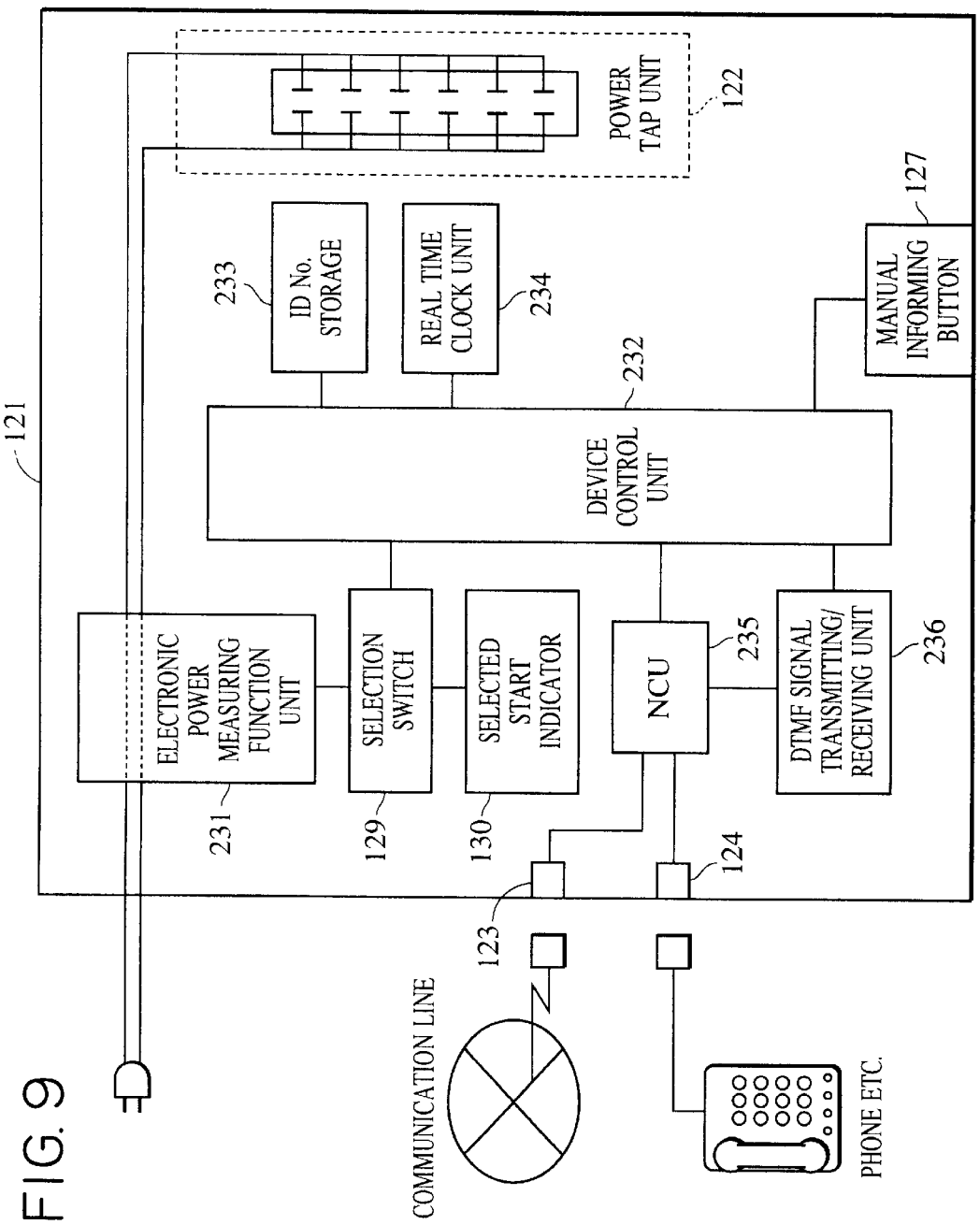
FIG. 9 is a block diagram showing an internal configuration of the power consumption management apparatus according to the second embodiment.

FIG. 9 shows an internal configuration of the power consumption management apparatus 121 according to the second embodiment. The processing operation of the power consumption management apparatus 121 will be described with reference to FIG. 9.

The operation of an electronic power measuring function unit 231 is exactly the same as that in the first embodiment. However, when the selection switch 129 is in the first state, A/D-converted signals, which are produced by the electronic power measuring function unit 231 and represent respectively a current and a voltage proportional to total power consumption of all electric equipment connected to the power tap unit 122, are cut off by the selection switch 129 and are not transferred to a device control unit 232. In this condition, the indication lamp of the selected state indicator 130 lights up red.

When the selection switch 129 is in the second state, the A/D-converted signals, which are produced by the electronic power measuring function unit 231 and represent respectively a current and a voltage proportional to total power consumption of all the electric equipment connected to the power tap unit 122, are transferred to the device control unit 232 through the selection switch 129, followed by exactly the same processing operation as in the first embodiment. In this condition, the indication lamp of the selected state indicator 130 lights up green.

Furthermore, the construction and operation of a management computer used in the second embodiment are exactly the same as in the first embodiment.

With the second embodiment constructed as described above, the homeworker can manually operate the selection switch 129 to select whether power consumption resulted from the use of the various information communications equipment and household electrical appliances, which are connected to the power consumption management apparatus 121, is taken into management of the power consumption. Specifically, the homeworker sets the selection switch 129 into the second state during a period in which he or she is engaged in business work for the company employing the homeworker, whereupon the integrated amount of power consumption is reported to the company with a demand for payment of extra money as an expense. On the other hand, the homeworker sets the selection switch 129 into the first state during a rest period, before the start and after the end of working hours, and during holidays, whereby the power consumption from the use of the various information communications equipment and household electrical appliances for private purposes is not reported to the company, since the expenses generated by power consumption for private purposes are paid by the homeworker, not the company.

Third Embodiment

Figure 10:
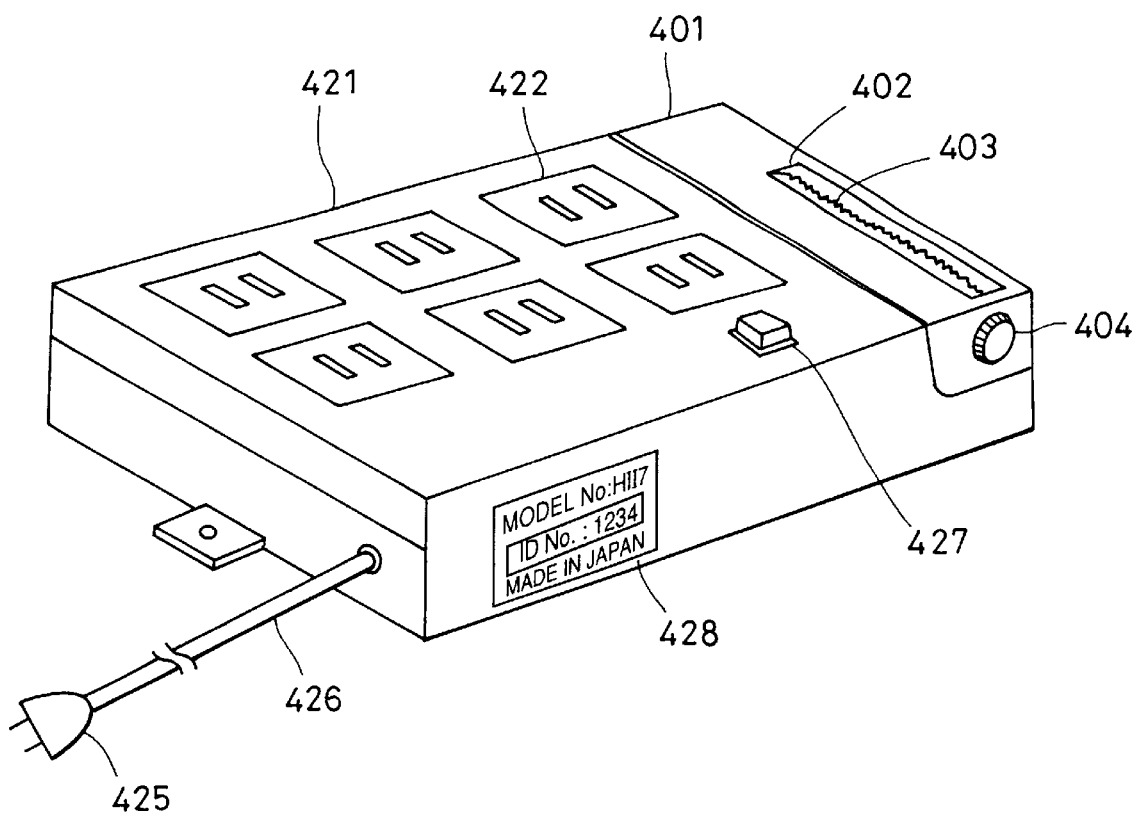
FIG. 10 is a perspective view showing an appearance of a power consumption management apparatus according to a third embodiment of the present invention.

A power consumption management apparatus according to a third embodiment of the present invention will be described with reference to FIG. 10 which shows an appearance of the apparatus.

This third embodiment of the present invention intends measures power consumption in a home office and prints out an integrated value of the power consumption during a certain period by using a printer incorporated in the power consumption management apparatus. An employee engaged in the home office reports the printed-out value to an employer by handing or sending a print-out directly or via facsimile transmission or mail to the employer so that the employee can receive payment from the company for power consumed in the home office. The information received from this print-out may also be used to prepare a written or oral report.

Numeral 421 denotes the power consumption management apparatus according to the third embodiment. Numerals 422, 425, 426 and 428 denote exactly the same components as denoted by 22, 25, 26 and 28 in the first embodiment, and therefore description of those components is omitted here. Numeral 427 denotes a manual totalizing button which is depressed by the user when power consumption management data in the power consumption management apparatus 421 is to be printed out upon manual instruction at any desired time rather than at certain intervals.

Numeral 401 denotes a printer cover under which a roll of printing paper is accommodated. By raising the printer cover 401, the roll of printing paper can be replaced with a new one when required. Numeral 402 denotes a paper ejection opening through which the paper including data printed thereon is ejected. Numeral 403 denotes a manual paper cutter which is employed by the user for cutting a desired portion of the ejected printing paper into a piece. Numeral 404 denotes a manual paper advancing knob which is rotated by the user for advancing the printing paper as required.

Figure 11:
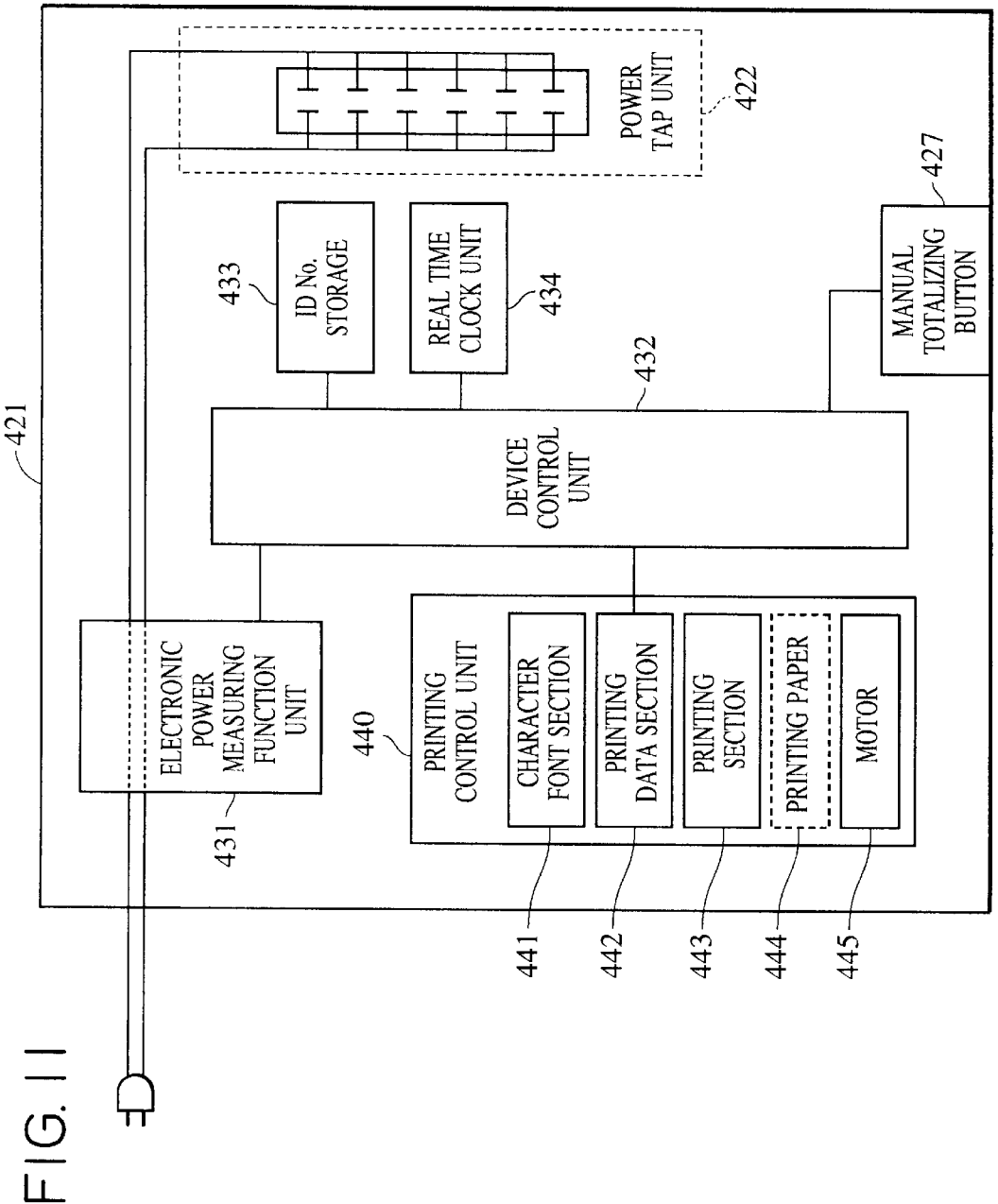
FIG. 11 is a block diagram showing an internal configuration of the power consumption management apparatus according to the third embodiment.

FIG. 11 shows an internal configuration of the power consumption management apparatus 421 according to the third embodiment. The processing operation of the power consumption management apparatus 421 will be described with reference to FIG. 11.

The operation of an electronic power measuring function unit 431 is exactly the same as that in the first embodiment. A device control unit 432 always monitors and processes data regarding the current and voltage sent from the electronic power measuring function unit 431, and then calculates and stores instantaneous power consumption and an integrated amount of power consumption. Upon the manual totalizing button 427 being depressed, or at certain intervals, e.g., once per month, the device control unit 432 transmits the integrated power data to a printing data section 442. When the printing data section 442 receives the integrated power data, the whole of a printing control unit 440 is brought into operation to create printing data based on both a character font stored in a character font section 441 beforehand and the integrated power data received from the device control unit 432, followed by transferring the printing data to a printing section 443. The printing section 443 comprises a small-sized printer utilizing an ink jet printing system. The printing data received from the printing data section 442 is printed on printing paper 444, while the printing paper 444 is automatically fed to go through the paper ejection opening 402 with operation of a motor 445.

FIG. 12 shows one example of the printing paper on which data is printed.

With the third embodiment constructed as described above, power consumption in the home office is measured, and an integrated value of the power consumption during a certain period is printed out by using the printer incorporated in the power consumption management apparatus. The employee engaged in the home office reports the printed-out value to the employer by handing or sending a piece of printed-out paper as shown in FIG. 12, for example, directly or via facsimile transmission or mail, or by preparing an oral or written report, so that the employee can receive payment from the company for power consumed in the home office.

The management computer described in the first and second embodiments is not necessarily required in this third embodiment. However, an operator of the management computer may manually enter, in the management computer, the results on pieces of the printed-out paper which have been provided by the homeworkers to the company, etc. This enables the power consumption management method to be carried out in a manner similar to that described in the first embodiment.

Fourth Embodiment

The present invention may also be implemented by combining the second and third embodiments with each other. Specifically, the power consumption management apparatus may be modified such that a switch means is provided to select one of a period during which an integrated amount of power consumption of electric equipment connected to itself is measured and stored, and a period during which the integrated amount of power consumption is not measured, and that a printer is also provided to print out the integrated amount of power consumption.

In the above first to fourth embodiments, the power consumption management apparatus incorporates the power tap unit which has a plurality of receptacles for power supply. However, an externally connected power tap unit may be used instead of incorporating the power tap unit in the apparatus.

Also, in the above first and second embodiments, the management computer is made up of the universal personal computer 51, the phone line board 52 with the DTMF signal transmitting/receiving circuit incorporated therein, and the dedicated software. However, the management computer is not limited to such a construction, but may comprise a dedicated apparatus.

Further, the power consumption management apparatus is not necessarily required to be a standalone apparatus, but may be incorporated in a UPS (Uninterruptible Power Supply System).

Moreover, the power consumption management apparatus according to each of the above embodiments may be provided with such additional functions as a power switch, a power breaker and a noise filter.

Note that the present invention is applicable to not only a system comprising plural units of equipment, but also an apparatus comprising a single unit of equipment.

The present invention can also be implemented by supplying, to a system or an apparatus, a storage medium in which a program code for software used in the management computer in the above embodiments is stored, and by rendering a computer (or a CPU or MPU) in the system or the apparatus to read and execute the program code stored in the storage medium.

According to the present invention, as described above, when employees of an organization such as a company are engaged in business at home offices, power consumption in each home office can be precisely determined, and the company can precisely determine home office expenses as a part of overall office expenses. The company can therefore implement a home-based working system and pay home-workers extra money that corresponds to the home office power consumption expenses so as not to expose an extra burden on the household economy of the homeworkers.

The above-described embodiments of the present invention are also applicable to achieve any suitable object effectively in addition to the object of reporting the amount of power consumption in the home offices of the homeworkers to the employer so that the corresponding expenses can be paid to the homeworkers by the employer.

For example, the present invention is applicable to achieve various other objects in the following cases: (1) a company wants to measure the amount of power consumption by individual employees working in a business office, or the amount of power consumption in individual divisions occupied by individual groups; (2) the owner of a rental office, a public office space or the like wants to measured the amount of power consumption by various office users so that each office user can be charged for their corresponding electrical charges; and (3) when a company wants to install their own equipment in a part of a second company's business office, the first company wants to measure the specific amount of power consumed by the installed equipment and reimburse the second company managing the business office for an expense corresponding to the amount of power consumption.

While the present invention has been described with respect to what are presently considered to be the preferred embodiments, it is to be understood that the invention is not limited to the disclosed embodiments. The present invention is intended to cover various modifications and equivalent arrangements included within the spirit and scope of the appended claims.

What is claimed is:

1. A power consumption management apparatus comprising:

plug means for connecting said apparatus to a receptacle in a house;

power consumption managing means for supplying power to be supplied through said plug means to electric equipment connected to said apparatus, and for measuring and storing an integrated amount of power consumed by the electric equipment; and communicating means for reporting the integrated amount of power consumption stored in said power consumption managing means to another location via a communication line.

2. A power consumption management apparatus according to claim 1, wherein said communicating means periodically reports the integrated amount of power consumption to another location.

3. A power consumption management apparatus according to claim 1, wherein said communicating means reports the integrated amount of power consumption to another location upon an instruction from an operator.

4. A power consumption management apparatus according to claim 1, wherein said communicating means reports the integrated amount of power consumption along with identification information.

5. A power consumption management apparatus according to claim 1, wherein said power consumption managing means incorporates power tap means for connection to plugs of the electric equipment for power supply.

6. A power consumption management apparatus according to claim 1, wherein said power consumption managing means includes instructing means for instructing whether or not to measure and store the integrated amount of power consumed by the electric equipment connected to said apparatus.

7. A power consumption management apparatus according to claim 6, wherein said power consumption managing means stores the integrated amount of power consumption when said instructing means issues an instruction to store the integrated amount of power consumption.

8. A power consumption management method comprising the steps of:

storing, prior to said receiving step, in a management computer, a correspondence between identification information of a plurality of power consumption management apparatuses each having a selection switch for selecting one of a first state and a second state and a plurality of user names associated with each of the plurality of power consumption management apparatuses;

receiving integrated amounts of power consumption and corresponding identification information both transmitted from the plurality of power consumption management apparatuses, acquiring the user names that correspond to the identification information received in said receiving step by referring to the correspondence stored in the management computer in said storing step; and combining the user names acquired in said user name acquiring step with the integrated amounts of power consumption which are received in said receiving step and correspond to the user names, wherein, in said receiving step, information transmitted from each of the plurality of power consumption management apparatuses is received only when the selection switch of each of the plurality of power consumption management apparatuses is switched to either the first state or the second state.

9. A power consumption management method according to claim 8, further comprising the steps of:

deriving electrical charges based on the integrated amounts of power consumption received in said receiving step by referring to a correlation between integrated amounts of power consumption and electrical charges, the correlation being registered prior to said receiving step, and combining the electrical charges derived in said electrical charge deriving step with the user names acquired in said user name acquiring step.

10. A storage medium storing a program readable by a computer to execute:

storing, prior to said receiving step, in a management computer, a correspondence between identification information of a plurality of power consumption management apparatuses each having a selection switch for selecting one of a first state and a second state and a plurality of user names associated with each of the plurality of power consumption management apparatuses;

receiving integrated amounts of power consumption and corresponding identification information both transmitted from the plurality of power consumption management apparatuses, acquiring the user names that correspond to the identification information received in said receiving step by referring to the correspondence stored in the management computer in said storing step; and combining the user names acquired in said user name acquiring step with the integrated amounts of power consumption which are received in said receiving step and correspond to the user names, wherein, in said receiving step, information transmitted from each of the plurality of power consumption management apparatuses is received only when the selection switch of each of the plurality of power consumption management apparatuses is switched to either the first state or the second state.

11. A storage medium according to claim 10, wherein said program further executes:

an electrical charge deriving step for deriving electrical charges based on the integrated amounts of power consumption received in said receiving step by referring to a correlation between integrated amounts of power consumption and electrical charges, the correlation being registered prior to said receiving step, and a second combining step for combining the electrical charges derived in said electrical charge deriving step with the user names acquired in said user names acquiring step.

12. A power consumption management apparatus comprising:

power consumption managing means for supplying power to electric equipment connected to said apparatus, and measuring and storing an integrated amount of power consumed by the electric equipment; and communicating means for reporting the integrated amount of power consumption stored in said power consumption managing means to another location via a communication line, wherein said power consumption managing means includes instructing means for instructing whether or not to measure and store the integrated amount of power consumed by the electric equipment connected to said apparatus.

13. A power consumption management apparatus according to claim 12, wherein said power consumption managing means stores the integrated amount of power consumption when said instructing means issues an instruction to store the integrated amount of power consumption.

* * * * *

UNITED STATES PATENT AND TRADEMARK OFFICE
CERTIFICATE OF CORRECTION

PATENT NO. : 6,476,728 B1
DATED : November 5, 2002
INVENTOR(S) : Ken Sakakibara

It is certified that error appears in the above-identified patent and that said Letters Patent is hereby corrected as shown below:

<u>Column 1,</u>
Line 24, ""organizations"" should read -- "organizations" or --.

<u>Column 6,</u>
Line 60, "(Kwh)." should read -- (Kwh)). --.

<u>Column 11,</u>
Line 58, "measured" should read -- measure --.

Signed and Sealed this

Tenth Day of June, 2003

JAMES E. ROGAN
*Director of the United States Patent and Trademark Office*